(12) United States Patent
Aoki et al.

(10) Patent No.: US 7,237,511 B2
(45) Date of Patent: Jul. 3, 2007

(54) COOLING DEVICE OF ENGINE

(75) Inventors: Akinobu Aoki, Hiroshima (JP); Mitsuo Hitomi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/358,217

(22) Filed: Feb. 22, 2006

(65) Prior Publication Data
US 2006/0213460 A1    Sep. 28, 2006

(30) Foreign Application Priority Data
Mar. 25, 2005  (JP) .............................. 2005-087630
Mar. 25, 2005  (JP) .............................. 2005-087631

(51) Int. Cl.
*F01P 7/14*   (2006.01)
*F01P 3/00*   (2006.01)

(52) U.S. Cl. ................ 123/41.08; 123/41.1; 123/41.29

(58) Field of Classification Search ............. 123/41.08, 123/41.09, 41.1, 41.29
See application file for complete search history.

(56) References Cited

U.S. PATENT DOCUMENTS 5,529,026 A * 6/1996 Kurr et al. ................. 123/41.1

FOREIGN PATENT DOCUMENTS

JP         2004-353632        12/2004

* cited by examiner

*Primary Examiner*—Noah P. Kamen
(74) *Attorney, Agent, or Firm*—Nixon Peabody LLP; Donald R. Studebaker

(57) ABSTRACT

There are provided a radiator passage, a thermostat to open and close the radiator passage according to an engine temperature, a heater passage, a flow adjusting device to adjust a flow amount of the coolant that flows in the water jacket according to the engine temperature at an engine start. The flow adjusting device is configured so as to adjust the flow amount of the coolant flowing in the water jacket to be a normal amount when the engine temperature is in an extremely-cold condition, to be zero or smaller than the normal amount when the engine is in a mild-cold condition, and to be the normal amount when the engine is in a warm condition. The heater passage is in opened sate at least when the engine is in the extremely-cold condition.

9 Claims, 7 Drawing Sheets

COOLING DEVICE OF ENGINE

BACKGROUND OF THE INVENTION

The present invention relates to a cooling device of an engine, in which the engine is cooled with a cooling water that is circulated in a water jacket of the engine and a radiator, a heater unit for heating a vehicle cabin and the like.

A cooling system with the cooling water that is circulated between the water jacket in a cylinder block and a cylinder head and the radiator is known as an engine cooling method. In this system, the heater unit for heating the vehicle cabin with the heated cooling water is generally disposed in a cooling-water circulation passage in parallel to the radiator.

For example, Japanese Patent Laid-Open Publication No. 2004-353632 discloses the cooling device of an engine that comprises the cooling-water circulation passage in which the cooling water is circulated between the water jacket of the engine and the radiator, the heater circulation passage that has a common passage to the cooling-water circulation passage, in which the cooling water is circulated between the water jacket and the heater unit, and the thermostat provided in the cooling-water circulation passage and operative to open and close the cooling-water circulation passage led to the radiator according to the temperature of the cooling-water fed from the water jacket. In this device, the flow passage of the cooling water led to the radiator is controlled to be closed until the cooling-water temperature increases to a specified temperature, so that the cooling water can be circulated only in the heater circulation passage. Thus, the quick warming-up of the engine is attained and the emission function of the engine is improved.

Further, the above-described device has an advantage that since the cooling water is always circulated in the heater circulation passage, the heating of the vehicle cabin can be achieved properly so as to meet the passenger's heating requirement from the engine start.

Meanwhile, since the heat exchange between the air supplied to the vehicle cabin and the cooling water is conducted at the heater unit, some heat value is taken from the cooling water at the heater unit, so that there is a limit to the quick warming-up of the engine.

Herein, in the case where the engine is restarted soon after the engine stop, the cooling-temperature and the cabin temperature would not reduce to the air temperature outside the vehicle soon, so the cooling-water temperature may be increased to a specified temperature rather promptly. In this case, if the cooling water is supplied to the heater circulation passage, the heating would be conducted at the engine start, but the engine warming-up would be delayed and therefore the properly-heated air would not be supplied to the cabin promptly. In this case, some measures to heat the engine promptly should be necessary.

Herein, in the case where the air temperature outside is relatively high, such as in summer, passing the cooling water in the heater circulation passage would bring a prolonged period of the engine warming-up, thereby deteriorating the emission function of the engine.

Meanwhile, in order to give priority to the quick warming-up of the engine, for example, there could be provided a bypass passage to bypass the radiator and the heater unit or the water pump could be stopped, so that the cooling water could remain in the water jacket and the engine could be heated promptly. However, in the case where the air temperature outside is extremely low, such as in winter, it is better that the operation of the heater unit should be available from an early stage because the cabin could be heated to a certain degree with the cooling water whose temperature has not increased sufficiently yet.

Herein, in the case where the above-described bypass passage is controlled in its opening and closing with an electromagnetic valve that is activated in response to signals from sensors, this would increase costs. Meanwhile, in the case where the water pump is stopped, some control measures to drive the water pump separately from the engine operation (without a direct connection between the pump and engine) would be necessary, this would increase manufacturing costs as well.

SUMMARY OF THE INVENTION

The present invention has been devised in view of the above-described things, and an object of the present invention is to provide a cooling device of an engine that can improve an engine's warming-up and achieve a proper emission function of the engine, meeting properly requirements of passenger's heating at the engine start. Another object of the present invention is to provide a cooling device of an engine that can perform the above-described functions at low manufacturing costs.

According to a first aspect of the present invention, there is provided a cooling device of an engine, comprising a radiator passage in which coolant is circulated by a water pump between a water jacket of the engine and a radiator, a thermostat provided in the radiator passage and operative to open the radiator passage when an engine temperature is a specified passage-opening temperature or higher, and to close the radiator passage when the engine temperature is lower than the specified passage-opening temperature, a heater passage in which the coolant is circulated between the water jacket and a heater unit for heating of a vehicle cabin, and a flow adjusting device operative to adjust a flow amount of the coolant that flows in the water jacket according to the engine temperature at an engine start, wherein the flow adjusting device is configured so as to adjust the flow amount of the coolant flowing in the water jacket to be a normal amount when the engine temperature is in an extremely-cold condition where the engine temperature is lower than an extremely-cold standard temperature that is lower than the specified passage-opening temperature, to be zero or smaller than the normal amount when the engine is in a mild-cold condition where the engine temperature is or higher than the extremely-cold standard temperature and lower than a mild-cold standard temperature that is lower than the specified passage-opening temperature, and to be the normal amount when the engine is in a warm condition where the engine temperature is or higher than the mild-cold standard temperature, and the heater passage is configured so as to be opened at least when the engine is in the extremely-cold condition.

According to the first aspect of the present invention, there is provided the flow adjusting device operative to adjust the flow amount of the coolant that flows in the water jacket according to the engine temperature at the engine start, this flow adjusting device is configured so as to adjust the flow amount of the coolant flowing in the water jacket to be the normal amount when the engine temperature is in the extremely-cold condition where the engine temperature is lower than the extremely-cold standard temperature that is lower than the specified passage-opening temperature for opening the thermostat, and the heater passage is configured so as to be opened at least when the engine is in the extremely-cold condition. Thereby, the coolant fed from the water jacket is supplied to the heater passage, so the heater unit can function from the engine start and thereby the heating of a vehicle cabin can be performed properly. Namely, when the engine is in the extremely-cold condition where the engine temperature is low, the coolant, such as a cooling water, is supplied to the heater unit, not to the radiator, so the heating is given priority to from the engine start and the passenger's heating requirement can be met properly.

Meanwhile, the flow adjusting device is configured so as to adjust the flow amount of the coolant flowing in the water jacket to be zero or smaller than the normal amount when the engine is in the mild-cold condition where the engine temperature is or higher than the extremely-cold standard temperature and lower than the mild-cold standard temperature that is lower than the specified passage-opening temperature. Thereby, the flow amount of coolant in the water jacket reduces or the coolant remains there without flowing. Accordingly, the coolant in the water jacket is increased in temperature promptly, so the quick warming-up of the engine can be attained and thus CO, HC, incomplete-combustion gas can be reduced, thereby improving the proper emission function of the engine. Also, when the engine is in the mild-cold condition, the temperature in the cabin is not so low. Accordingly, after the coolant' temperature has been increased by the quick-warming up, the sufficiently heated conditioning air can be supplied to the cabin, so the passenger's heating requirement can be met properly.

Further, the flow adjusting device is configured so as to adjust the flow amount of the coolant flowing in the water jacket to be the normal amount when the engine is in the warm condition where the engine temperature is or higher than the mild-cold standard temperature, i.e., when no heating is necessary.

As described above, according to the first aspect of the present invention, the temperature in the cabin is determined (assumed) based on the engine temperature and either one of requirements of the passenger's heating and the engine's quick warming-up is given priority to properly according to this temperature. Thus, both requirements can be effectively met.

Herein, although the flow adjusting device may be configured so as to detect the engine temperature directly with the temperature of the coolant flowing in the passages and the flow amount adjusting of the coolant flowing in the water jacket may be changed according to the engine condition changing from the extremely-cold condition to the mild-cold condition, it is preferable that the flow adjusting device is configured so as to detect the engine temperature based on the temperature of the coolant and to comprise a delayed-temperature changing chamber where the coolant temperature changes with a time lag relative to the temperature of the coolant outside thereof, and the extremely-cold condition of the engine is determined based on the temperature of the coolant that is in the delayed-temperature changing chamber.

Thereby, when the engine is in the extremely-cold condition at the engine start, even if the temperature of the coolant flowing in the passages increases and exceeds the extremely-cold standard temperature, the temperature of the coolant in the delayed-temperature changing chamber does not increase over the extremely-cold standard temperature soon, i.e., the coolant temperature in the delayed-temperature changing chamber changes with a specified time lag. Accordingly, when the engine condition changes from the extremely-cold condition to the mild-cold condition, the flow amount adjusting of the coolant flowing in the water jacket is also changed with the specified time lag. Or, in the case where the flow adjusting device is configured so as to detect the engine temperature directly with the temperature of the coolant flowing in the passages, and when the temperature of the coolant flowing during the above-described time lag exceeds the mild-cold standard temperature, the control of the flow adjusting device in the engine warm condition is executed, omitting the control of the flow adjusting device in the mild-cold condition.

Thus, since when the engine starts from the extremely-cold condition, the control period of the flow adjusting device in the mild-cold condition is shortened, or omitted, the period of time when the heated conditioning air is not supplied can be shortened or the supply can be maintained, thereby meeting the passenger's heating requirement sufficiently.

Although the flow adjusting device should not be limited to a particular structure, it is preferable that the flow adjusting device comprises a short-cut passage to interconnect an inlet port and an outlet port of the water pump and a valve-opening mechanism operative to open and close the short-cut passage, and the flow adjusting device is configured so as to reduce the flow amount of the coolant flowing in the water jacket by opening the short-cut passage to introduce at least part of the coolant fed from the water pump into the short-cut passage.

Thereby, the flow adjusting device can be constituted simply and at low costs by providing the short-cut passage and the valve-opening mechanism. Further, for example, even in the case where the mechanical water pump driven by the engine is used, the flow amount of the coolant flowing in the water jacket can be properly adjusted by flowing into the short-cut passage, thereby executing the proper control with the simple structure.

In this case, it is preferable that the valve-opening mechanism of the flow adjusting device comprises a valve body operative to open and close the short-cut passage, a biasing member operative to bias the valve body in its opening direction or in its closing direction, a first temperature-responsive biasing member operative to generate a biasing force according to changing of the coolant temperature so as to bias the valve body in an opposite direction to the biasing direction of the biasing member, and a second temperature-responsive biasing member operative to generate a biasing force according to changing of the coolant temperature so as to bias the valve body in the same direction as the biasing direction of the biasing member, the first and second temperature-responsive biasing member are configured such that a specified temperature thereof at which the biasing force is generated is set to either the extremely-cold standard temperature or the mild-cold standard temperature, and the valve opening mechanism is configured to so as to bias the valve body to its closed position when the engine at starting is in the extremely-clod condition, to bias the valve body to its opened position when the engine at starting is in the mild-clod condition, and to bias the valve body to its closed position when the engine at starting is in the warm condition.

Thereby, the valve-opening mechanism can be operated mechanically, thereby providing the valve-opening mechanism surely and at low costs.

Also, although the thermostat may be an electrically-operated thermostat, it is preferable that the thermostat is a mechanical thermostat that is operated mechanically.

Thereby, the cooling device according to the present invention can be constituted mechanically and at low costs.

According to a second aspect of the present invention, there is provided a cooling device of an engine, comprising a radiator passage in which coolant is circulated between a water jacket of the engine and a radiator when an engine temperature is a specified passage-opening temperature or higher, a heater passage in which the coolant is circulated between the water jacket and a heater unit for heating of a vehicle cabin, part of the heater passage overlapping with the radiator passage, a water pump operative to circulate the coolant, the water pump being disposed at an overlapping portion of the passages, a short-cut passage to interconnect an upstream passage and a downstream passage of the water pump, and a valve-opening mechanism operative to adjust a flow amount of the coolant that flows in the water jacket by opening and closing the short-cut passage, wherein the valve-opening mechanism comprises a valve body operative to open and close the short-cut passage, an elastic member operative to bias the valve body in its closing direction, a first shape-memory-alloy spring operative to bias the valve body in its opening direction by responding to a specified temperature that is a shape-restoring temperature thereof or higher, and a second shape-memory-alloy spring operative to bias the valve body in its closing direction by responding to a specified temperature that is a shape-restoring temperature thereof or higher, the shape-restoring temperature of the first shape-memory-alloy spring being set to a first switching temperature that is lower than the specified passage-opening temperature, the shape-restoring temperature of the second shape-memory-alloy spring being set to a second switching temperature that is lower than the specified passage-opening temperature and higher than the first switching temperature, and the valve opening mechanism is configured to so as to bias the valve body to its closed position when the coolant temperature is lower than the first switching temperature, to bias the valve body to its opened position when the coolant temperature is or higher than the first switching temperature and lower than the second switching temperature, and to bias the valve body to its closed position when the coolant temperature is or higher than the second switching temperature.

According to the second aspect of the present invention, there are provided the short-cut passage to interconnect the upstream passage and the downstream passage of the water pump, and the valve-opening mechanism operative to adjust the flow amount of the coolant that flows in the water jacket by opening and closing the short-cut passage, and this valve-opening mechanism is configured so as to open and close the valve body according to the coolant temperature by using characteristics of the first and second shape-memory-alloy springs having different shape-restoring temperatures. Thereby, the degree of the passenger's heating requirement can be determined easily by the mechanical structure with the coolant temperature at the engine start by associating the first and second switching temperature with a relevant temperature in the vehicle cabin, and either one of requirements of the passenger's heating and the engine's quick warming-up is given priority to properly according to this degree of the passenger's heating requirement with a proper third-stage switching of the coolant passages for the other requirement. Thus, both requirements can be effectively met at low costs.

Namely, when the coolant temperature is lower than the first switching temperature, the first and second shape-memory-alloy springs do not reach their shape-restoring temperatures, so their valve bodies are biased to its closed position by the biasing force of the elastic member. Also, since the coolant temperature does not reach the specified passage-opening temperature, the radiator passage is closed. Thereby, the coolant is circulated between the water jacket and the heater unit in this condition. Herein, by setting the coolant temperature that is considered to correspond to the low temperature in the cabin to the first switching temperature, the coolant is supplied to the heater unit, not to the radiator, so the heating is given priority to from the engine start and the passenger's heating requirement can be met properly.

Meanwhile, when the coolant temperature at the engine start is higher than the first switching temperature and lower than the second switching temperature, the first shape-memory-alloy spring reaches its shape-restoring temperature and generates the biasing force. Thereby, the valve body is biased to the closed position. In this situation, since the coolant can be heated promptly, the valve body is changed to the opened position and thus the flow amount of the coolant flowing in the water jacket is stopped or reduced less than the above-described normal flow amount. Thus, the coolant temperature in the water jacket is increased promptly, so the quick warming-up of the engine can be attained and thus CO, HC, incomplete-combustion gas can be reduced, thereby improving the proper emission function of the engine. Also, since the temperature in the cabin is not so low at this moment, after the coolant' temperature has been increased by the quick-warming up, the sufficiently heated conditioning air is supplied to the cabin, so the passenger's heating requirement can be met properly.

Also, when the coolant temperature at the engine start is or higher than the second switching temperature, both the first and second shape-memory-alloy springs reach their shape-restoring temperatures and generate the biasing forces. Thereby, the valve bodies are biased to the closed position. In this situation, since the heating is not necessary, the flow amount of the coolant flowing in the water jacket is adjusted to the normal flow amount by closing the short-cut passage, thereby maintaining the normal operation state.

Further, since the valve body is controlled by a simple mechanical structure, the cost increase for modification can be suppressed properly.

Herein, although the first shape-memory-alloy spring may be disposed at a location where it can respond quickly to changing of the coolant temperature in the passages, it is preferable that the valve body comprises a delayed-temperature changing chamber where the coolant temperature changes with a time lag relative to the temperature of the coolant outside thereof and the first shape-memory-alloy spring is disposed in the delayed-temperature changing chamber.

Thereby, when the engine is started in the state where the coolant temperature is lower than the first switching temperature, even if the temperature of the coolant flowing in the passages increases and exceeds the first switching temperature, the temperature of the coolant in the delayed-temperature changing chamber does not increase over the first switching temperature soon, i.e., the coolant temperature in the delayed-temperature changing chamber changes with a specified time lag. Accordingly, when the engine temperature increases to the first switching temperature after the engine start, the flow amount adjusting of the coolant flowing in the water jacket is also changed with the specified time lag. Or, when the temperature of the coolant flowing during the above-described time lag exceeds the second switching temperature, the total biasing force of the elastic member and the second shape-memory-alloy spring is greater than that of the first shape-memory-alloy spring and the control that the coolant temperature is increased to the second switching temperature and higher is executed, omitting the control of the valve body being changed to the opened position. Namely, the closed position of the valve body is maintained.

Thus, since when the engine starts from the coolant temperature lower than the first switching temperature, for example, from the extremely-cold condition, the period of the valve body being opened is shortened, or omitted, the period of time when the heated conditioning air is not supplied can be shortened or the supply can be maintained, thereby meeting the passenger's heating requirement sufficiently.

Herein, although the heater passage may be kept in the opened position all the time, it is preferable that the opening valve mechanism is disposed in a housing that is located near the water pump, there is provided a heater-inlet port to introduce the coolant fed from the heater unit into the housing, and the valve body is disposed in the housing in such a manner that the heater-inlet port is closed by the valve body in its opened position, while the heater-inlet port is opened by the valve body in its closed position.

Thereby, the open/close control of the heater-inlet port can be attained by using the valve body for the short-cut passage, so the period of engine warming-up can be further shortened by closing the heater-inlet port during the period of changing from the first switching temperature to the second switching temperature and remaining the coolant in the water jacket.

Herein, although the specific structure of the water pump should not be limited to a particular one and the above-described housing for accommodating the valve-opening mechanism may be provided separately, it is preferable that the water pump is a centrifugal water pump that is provided upstream the water jacket and downstream of the housing, an inside of the housing is connected to an upstream-end portion of the water jacket via the short-cut passage, and there are provided in the hosing a radiator-inlet port to introduce the coolant fed from the radiator into the housing and a thermostat operative to open and close the radiator passage according to the temperature of the coolant.

Thereby, the water pump can be made at low manufacturing costs by using a widely-used pump of the centrifugal water pump, and the housing for accommodating the valve-opening mechanism can be formed by utilizing the existing thermostat housing. Thus, the cooling device according to the present invention can be provided without big design modifications from devices that have been used widely. Namely, the proper cooling device can be manufactured at low costs. Also, in the case where the centrifugal water pump that is driven by the engine is used, the flow amount of the coolant in the water jacket can be reduced or remained with a simple structure of the open/close control of the short-cut passage, and the passage switching can be surely conducted at low costs.

Other features, aspects and advantages of the present invention will become apparent from the following description which refers to the accompanying drawings.

BRIEF DESCRIPTION OF THE DRAWINGS

FIG. 5 is an explanatory diagram showing a time change of a coolant temperature and the like.

DETAILED DESCRIPTION OF THE INVENTION

Figure 1:
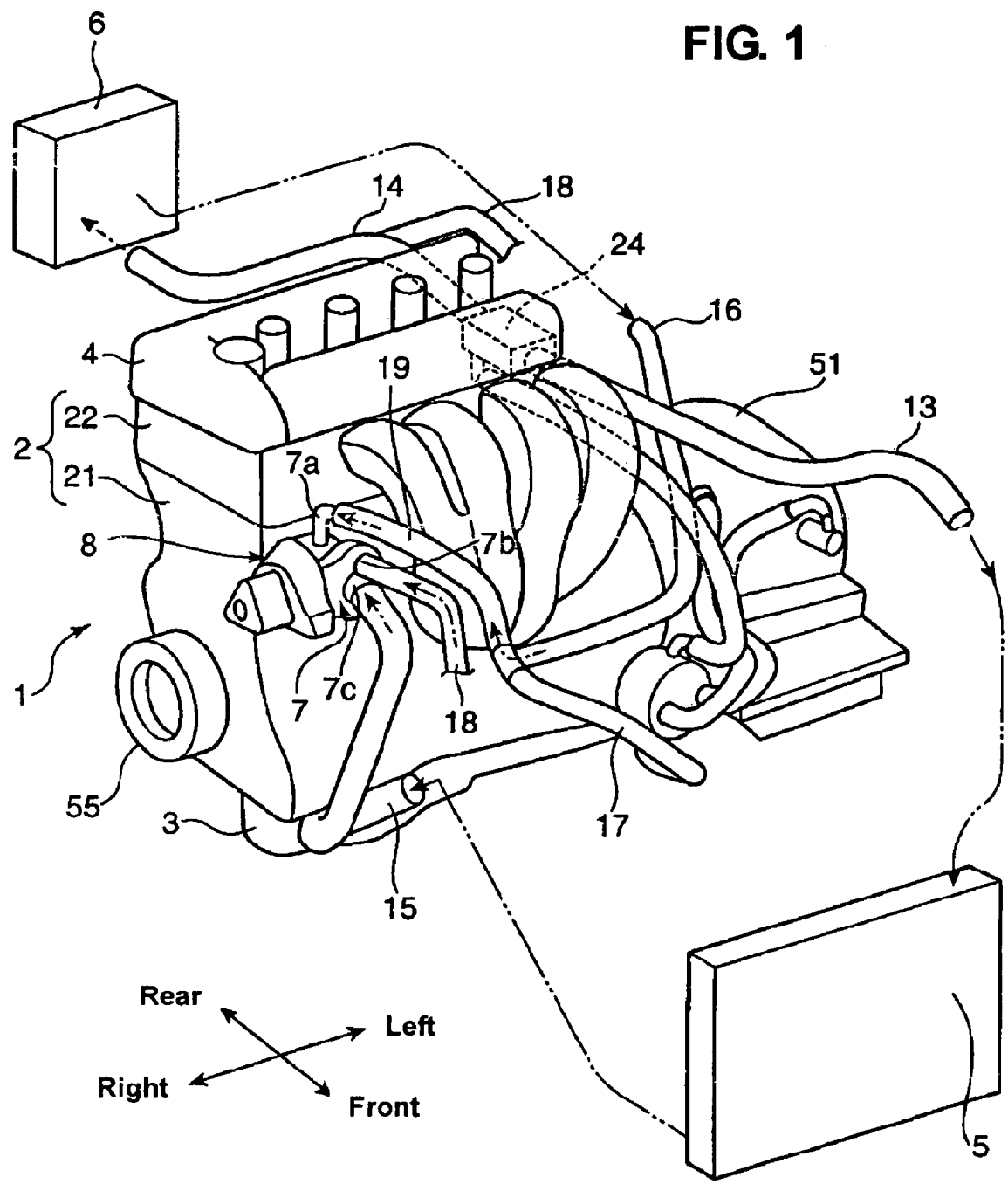
FIG. 1 is a schematic perspective view of a cooling device of an engine according to the present invention.
Figure 2:
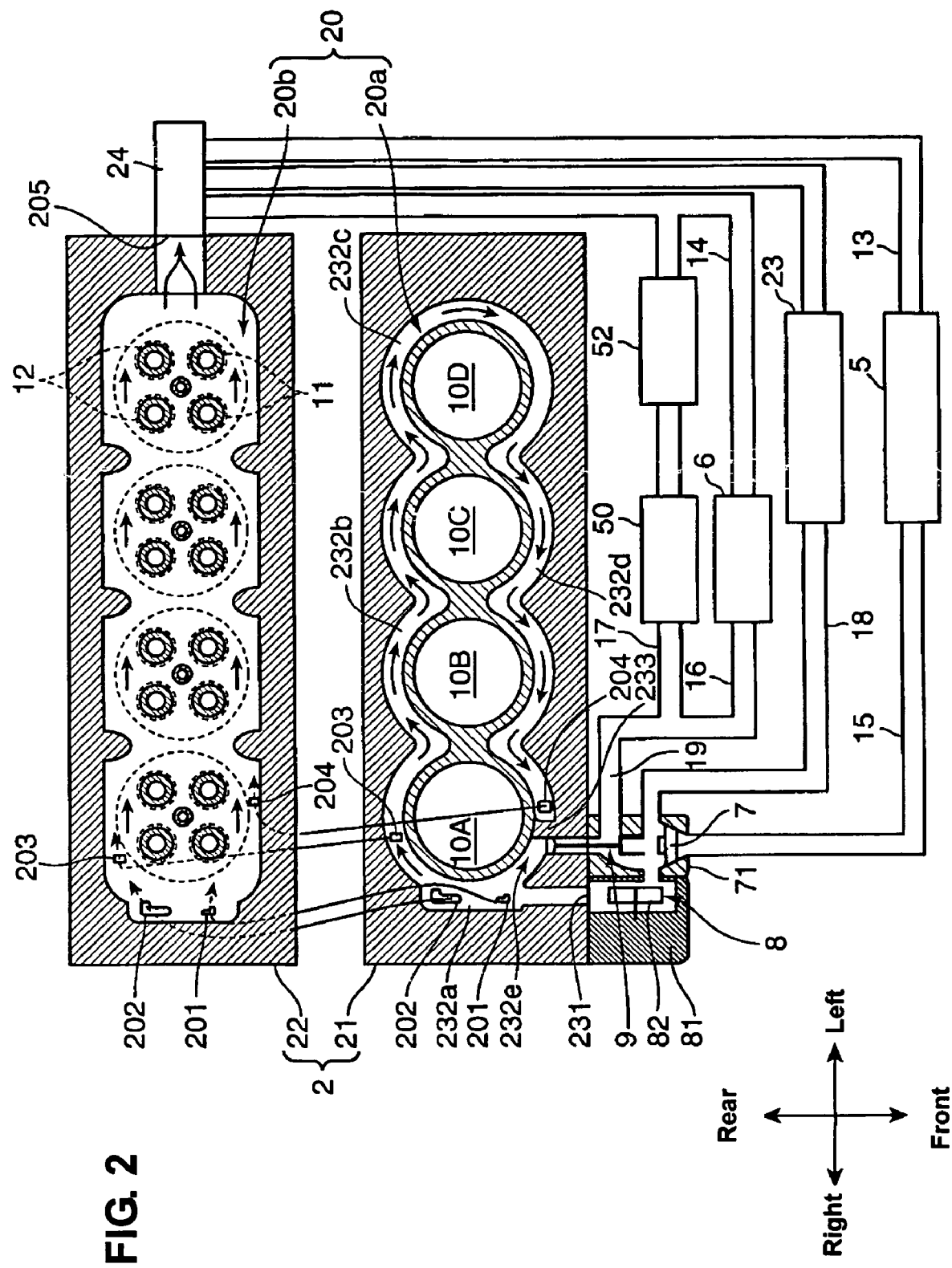
FIG. 2 is an explanatory diagram showing schematically the cooling device.

Hereinafter, preferred embodiments of the present invention will be described referring to the accompanying drawings. FIG. 1 is a schematic perspective view of a cooling device of an engine according to the present invention, and FIG. 2 is an explanatory diagram showing schematically this cooling device.

An engine 1 is disposed laterally in an engine room behind a engine hood at the front of a vehicle in such a manner that its crank shat extends in a vehicle width direction. The engine 1 is a 4-cylinder inline engine having four cylinders disposed in line, and a cross-flow type of engine, in which intake ports 11 opening at respective combustion chambers of cylinders 10A–10D are disposed at one side of the cylinders and exhaust ports 12 opening at respective combustion chambers of the cylinders 10A–10D are disposed at the other side of the cylinders. Thereby, as shown in FIG. 2, the intake ports 11 are located at the front side of the engine 1, while the exhaust ports 12 are located at the rear side of the engine 1.

The engine 1 is a type of engine in which the combustion heat generated at the cylinders 10A–10D is cooled with coolant, such as cooling water, that performs the heat exchange with air outside. Thus, the engine 1 has a cooling device comprising a radiator 5 and so forth.

Namely, the cooling device of the engine 1 comprises an engine body 2 with a water jacket 20, the radiator 5 disposed in front of the engine body 2, a heater unit 6 disposed behind the engine body 2, inlet pipes 13, 14 to supply the cooling water from the water jacket 20 to the radiator 5 and the heater unit 6, outlet pipes 15, 16 to return the coolant from the radiator 5 and the heater unit 6 to the water jacket 20, a bypass pipe 17 to bypass these radiator 5 and heater unit 6, a pressure adjusting pipe 18 having a pressure relief valve 23 to adjust pressure in the inlet pipes 13, 14 and the bypass pipe 17 (see FIG. 2), a thermostat 7 that is disposed in a thermostat housing 71 connected respectively to lower ends of the above-described pipes 15, 16, 17 and 18 and that open and close passages of the cooling water flowing in, and a water pump 8 that is disposed between the thermostat 7 and the water jacket 20 and circulates the cooling water.

In the present embodiment, as shown in FIG. 2, in the bypass passage 17 are provided an oil cooler 50 (heat exchanger) to cool engine oil with heat exchange and a ATF warmer 52 (heat exchanger) to warm oil for an automatic transmission 51 disposed beside the engine 1.

Thus, the cooling device has a cooling-water circulation passage comprising a radiator passage operative to circulate the cooling water between the water jacket 20 and the radiator 5, a heater passage operative to circulate the cooling water between the water jacket 20 and the heater unit 6, a bypass passage (sub circulation passage) operative to connect a cooling-water inlet port (a front opening of a cooling-water inlet port 231, which will be described below) to a cooling-water outlet port 205 of the water jacket 20 including the bypass pipe 17, and a pressure-adjusting bypass passage operative to adjust the cooling-water pressure in the upstream passages that bypass the radiator 5, heater unit 6, oil cooler 50 and ATF warmer 52. Herein, part of these passages (the heater passage and the bypass passage in the present embodiment) may be overlapped with each other.

Specifically, the engine 1 comprises, as shown in FIG. 1, the engine body 2 having the cylinders, an oil pan 3 provided at the bottom of the engine body 2, and a cylinder head cover 4 provided at the top of the engine body 2. The engine body 2, which is made by casting from cast iron or aluminum alloy, comprises a cylinder block 21 forming a cylinder body and a cylinder head 22 disposed on the cylinder block 21 via gasket (not shown) to form the top of cylinders. In the cylinder block 21 and the cylinder head 22 are provided a block-side water jacket 20*a* and a head-side water jacket 20*b*, which form the cooling-water circulation passage formed in the engine body 2. Namely, these water jackets 20*a*, 20*b* are space formed around the cylinders 10A–10D at the cylinder block 21 and the cylinder head 22 to constitute the passage of cooling water (cooling passage). Many kinds of circulation ways of the cooling water flowing in the water jackets 20*a*, 20*b* are known. In the present embodiment, however, a U-turn type is adopted to the block-side water jacket 20*a*, in which the cooling water is circulated around the cylinders 10A–10D in one-way direction. Meanwhile, an axis-flow type is adopted to the head-side water jacket 20*b*, in which the cooling water flows along the cylinder' line at both sides from the front to the rear of the engine.

The block-side water jacket 20*a* is, as shown in FIG. 2, disposed along the periphery of the cylinder block 21, surrounding the cylinders 10A–10D. One end of that is connected to the cooling-water inlet port 231 and the other end of that is connected to the water jacket 20*b* of the cylinder head 22.

The head-side water jacket 20*b* extends from one end to the other end of the cylinder head between a bottom deck (not illustrated) and a middle deck (not illustrated) as shown in FIG. 2. One end of that is connected to the head-side water jacket 20*b* via first through forth connecting passages 201–204, which will be descried below. The other end of that is connected to a water outlet member 24 via the cooling-water outlet port 205. The passages 201–204 open at the one end portion of the head-side water jacket 20*b* all together, which can provide the cooling water flowing along the cylinder line. The head-side water jacket 20*b* is also connected to the block-side water jacket 20*a* via an air-release passage (not illustrated) with a cross section that is smaller than that of the passages 201–204.

The block-side water jacket 20*a* will be described more in detail. This water jacket 20*a* includes a first cooling passage 232*a* that extends rearward from the cooling-water inlet port 231 on one longitudinal-side (right side in the figure) of the cylinder block 21, a second cooling passage 232*b* that is connected to the first cooling passage 232*a* and extends along the cylinder line on the exhaust side of the cylinder block 21 to the other longitudinal-side (left side in the figure) of the cylinder block 21, a third cooling passage 232*c* that is connected to the second cooling passage 232*b* and extends forward on the other longitudinal-side (left side in the figure) of the cylinder block 21, and a forth cooling passage 232*d* that is connected to the third cooling passage 232*c* and extends along the cylinder line on the intake side of the cylinder block 21 to the one longitudinal-side (right side in the figure) of the cylinder block 21. The cooling water flows in order of the first through forth cooling passages 232*a*–232*d*.

The first and second connecting passages 201, 202 connecting to the head-side water jacket 20*b* open to the first cooling passage 232*a* of the block-side water jacket 20*a*. The third and forth connecting passages 203, 204 connecting to the head-side water jacket 20*b* open to an upstream-end portion of the second cooling passage 232*b* and a downstream-end portion of the forth cooling passage 232*d*.

In the present embodiment the first through forth connecting passages 201–204 are configured so as to have different area of their passage-cross sections to each other in such a manner that the flow amount of cooling-water flow from the block-side water jacket 20*a* to the head-side water jacket 20*b* through the first through forth passages 201–204 becomes larger in the order of the second, first, forth and third connecting passages 202, 201, 204 and 203.

Meanwhile, the cooling-water inlet port 231 extends substantially in the same direction as the extending direction of the first cooling passage 232*a*, which can reduce a resistance of the flow to the first cooling passage 232*a*. At a peripheral portion of the cylinder block 21 between the base end portion of the first cooling passage 232*a* and the front end portion of the forth cooling passage 232*d* is provided a short-cut passage 232*e* that connects to the first cooling passage 232*a* at its one end. A partition wall 233 separates the short-cut passage 232*e* from the forth cooling passage 232*d*, so no cooling water flows directly between them.

Figure 3:
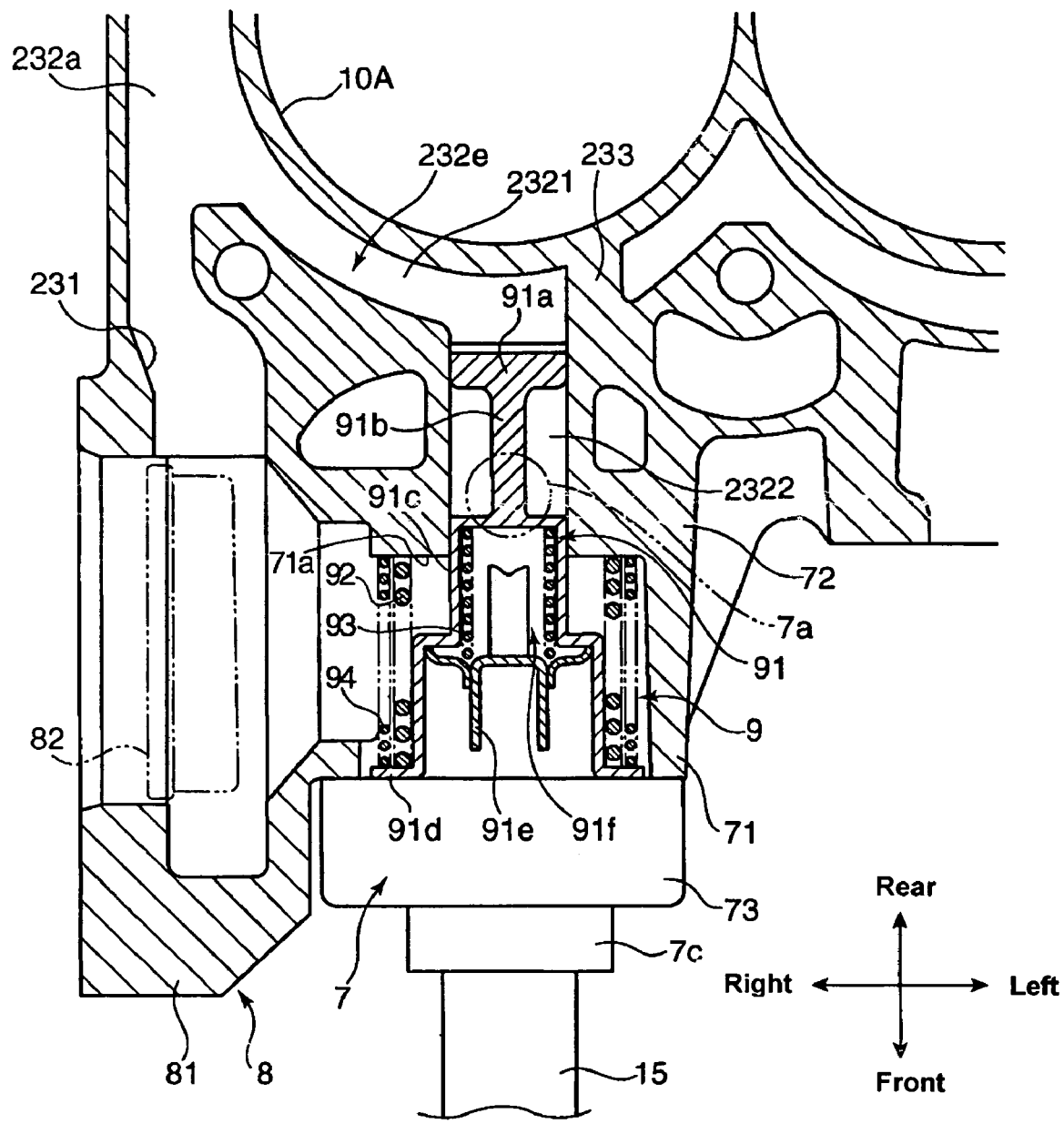
FIG. 3 is a sectional view of a major part of a flow adjusting device with a valve body in its closed position.

The short-cut passage 232*e*, as shown in FIG. 3, comprises a jacket portion 2321 that extends along the periphery of the cylinder 10A located at one end of the cylinder block 21 from the first cooling passage 232*a* to the forth cooling passage 232*d* and a short-cut port 2322 that extends from the front end portion of the jacket portion 2321 substantially in parallel to the cooling-water inlet port 231 in the thermostat housing 71, which will be described below. A heater inlet port 7*a*, which will be described below, opens to the short-cut port 2322 at its one end as shown with a two-dotted broken line in FIG. 3, and there is provided a valve body 91 of a valve-opening mechanism 9.

This valve-opening mechanism 9 is disposed downstream of the short-cut passage 232*e* and in the thermostat housing 71, and it is configured so as to open and close mechanically according to the temperature of the cooling water flowing in the housing 71. When the short-cut passage 232*e* is opened, most of the cooling water flowing in from the cooling-water inlet port 231 is introduced into the short-cut passage 232*e* with its reduced pressure due to the suction force of the water pump 8, and then flows down into the thermostat housing 71 upstream the water pump 8 via the short-cut passage 232*e*. Accordingly, during opening of the short-cut passage 232*e*, most of the cooling water fed from the water pump 8 circulates in the short-cut passage 232*e*, so that the flow amount of the cooling water flowing in the blocks-side and head-side water jacket 20*a*, 20*b* reduces to almost zero. Namely, these short-cut passage 232*e* and valve-opening mechanism 9 correspond to an example of a flow adjusting device operative to adjust the flow amount of the cooling water flowing in the water jacket 20.

The valve-opening mechanism 9 closes the short-cut passage 232*e* when the engine is in the extremely-cold condition, i.e., when the cooling-water temperature in a delayed-temperature changing chamber 91*f*, which will be described below, is lower than a radiator-passage opening temperature (76–82 degrees centigrade in the present embodiment) and lower than a specified extremely-cold standard temperature (approximately 20 degrees centigrade in the present embodiment). Meanwhile, when the engine is in the mild-cold condition, i.e., when the cooling-water temperature in the thermostat housing 71 is lower than a specified mild-cold standard temperature (approximately 70 degrees centigrade in the present embodiment) that is lower than the radiator-passage opening temperature and exceeds the above-described extremely-cold standard temperature, the valve-opening mechanism 9 opens the short-cut passage 232e. And when the engine is in the warm condition, i.e., when the cooling-water temperature exceeds the mild-cold standard temperature, the valve-opening mechanism 9 closes the short-cut passage 232e.

Specifically, the valve-opening mechanism 9, as shown in FIG. 3, comprises the valve body 91 to open and close the short-cut passage 232e, a biasing member 92 to bias the valve body 91 in its opening direction with its biasing force, a first temperature-responsive biasing member 93 to generate a specified biasing force when the cooling-water temperature exceeds the above-described extremely-cold standard temperature so as to bias the valve body 91 in its opening direction with this generated biasing force and the biasing force of the above-described biasing member 92, and a second temperature-responsive biasing member 94 to generate a specified biasing force when the cooling-water temperature exceeds the above-described mild-cold standard temperature so as to bias the valve body 91 in its closing direction with this generated biasing force and the biasing forces of the above-described biasing members 92, 93.

As shown in FIG. 3, the valve body 91 is formed according to the shape of cross section of the short-cut port 2322 of the short-cut passage 232e. A valve main body 91a provided at a tip of the valve body 91 is located at the short-cut port 2322 to close the passage 232e, while it is located at the water jacket portion 2321 to open the passage 232e. The valve main body 91a is supported at a valve rod 91b that is formed integrally therewith. The valve rod 91b has a cylindrical housing portion 91c with a bottom at its one end that is located on an opposite side to the valve main body 91a.

Figure 4:
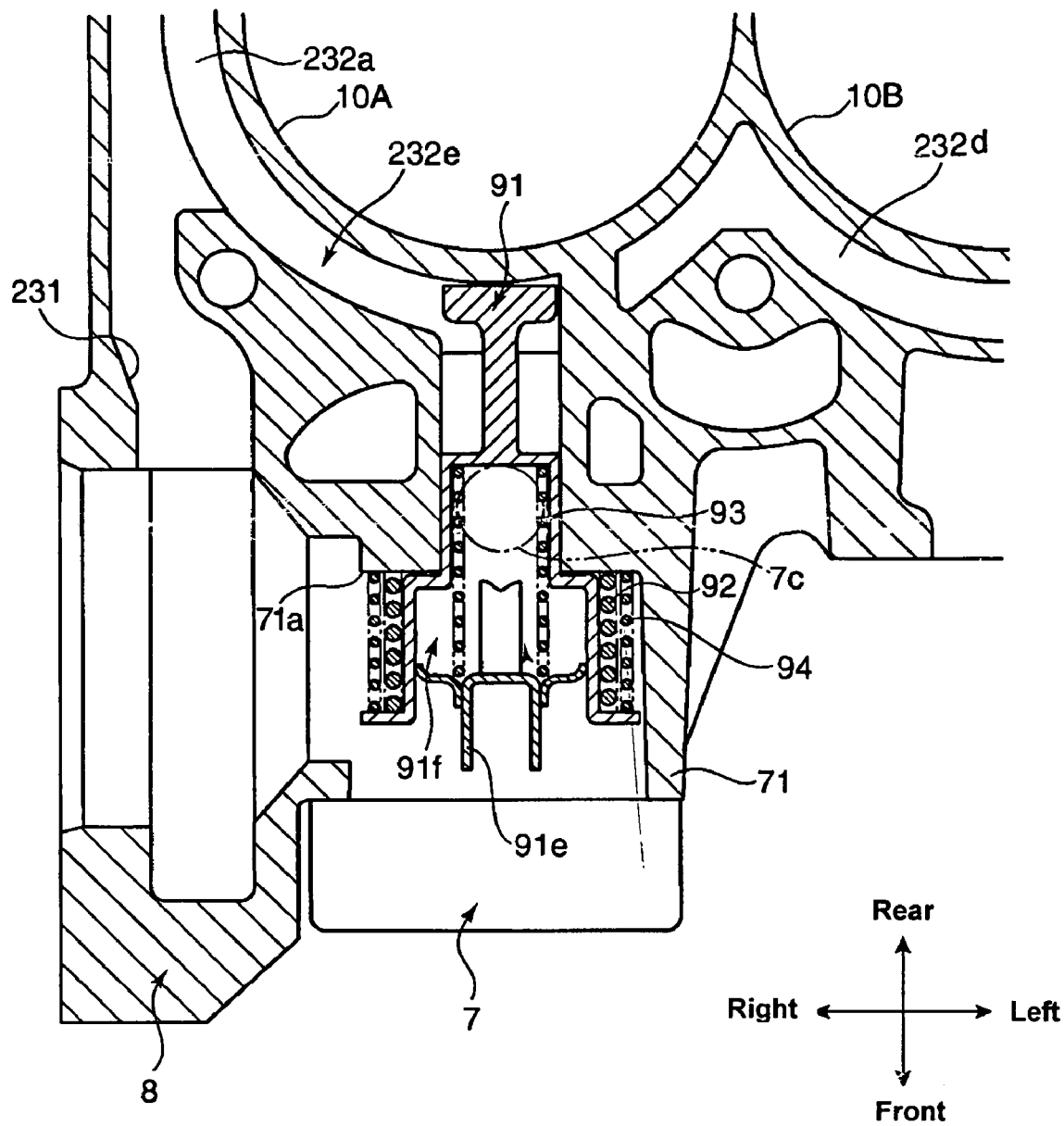
FIG. 4 is a sectional view of a major part of the flow adjusting device with the valve body in its opened position.

The housing portion 91c has an stepwise-enlarged peripheral wall and a flange 91d at its opening edge 91d, and accommodates the first temperature-responsive biasing member 91d therein at its narrow portion. The narrow portion of the housing portion 91c is inserted into the short-cut port 2322 of the short-cut passage 232e, and the heater inlet port 7a opening at the short-cut port 2322 is opened or closed by the periphery of this narrow portion of the valve body 91 moving in the present embodiment. Namely, when the valve body 91 is in the closed position, as shown in FIG. 3, the heater inlet port 7a is not closed by the narrow portion of the housing portion 91c. And when the valve body 91 is in the opened position, as shown in FIG. 4, the heater inlet port 7a is closed by the narrow portion of the housing portion 91c. Herein, the short-cut port 2322, the thermostat housing 71 and the valve body 91 are configured such that the cooling water flowing in from the heater inlet port 7a is introduced to the water pump 8 via the thermostat housing 71, which is not illustrated.

A flow-suppressing lid 91e to suppress the cooling water flowing into a accommodation space of the first temperature-responsive biasing member 93 is inserted into a wide portion of the hosing portion 91c. The flow-suppressing lid 91e is formed separately from the housing portion 91c, and attached at a specified portion of the thermostat housing 71. This attachment portion is configured such that the flow-suppressing lid 91e contacts a transitional portion where the diameter of the housing portion 91c changes when the valve body 91 is in the closed position.

And the flow-suppressing lid 91e is formed such that its outer periphery contacts and slides on an inner surface of the wide portion of the housing portion 91c. Accordingly, although it may not be easy for the cooling water to flow into the accommodation space of the housing portion 91c that is closed by the flow-suppressing lid 91e from a passage outside the housing portion 91c, the cooling water can flow through a small gap between the outer periphery of the flow-suppressing lid 91e and the inner surface of the housing portion 91c. As a result, the temperature of the cooling water located inside the hosing portion 91c changes with a time lag relative to the temperature of the cooling water located outside the housing portion 91c, so that the accommodation space in the housing portion 91c functions as the delayed-temperature changing chamber 91f.

In the delayed-temperature changing chamber 91f is provided the above-described first temperature-responsive biasing member 93. The first temperature-responsive biasing member 93 is a compression coil spring made of a shape-memory alloy (e.g., Ni—Ti alloy, Cu—Zu—Al alloy), which extends with a shape restoring and thereby bias the valve main body 91a in the opening direction.

The first temperature-responsive biasing member 93, which has the one-way shape-memory function that memorizes its shape to keep when the temperature increases, changes the valve main body 91a between its opened position and its closed position by a bias method with the bias member 92 as a bias spring. Herein, the bias method is a method in which the shape-memory alloy with the one-way shape-memory function is burdened by a specified outer force (e.g., the biasing force by a bias spring) so as to provide the both-way shape-memory function, so that the member can change in shape not only when the temperature increase but when the temperature decreases.

The shape-restoring temperature of this first temperature-responsive biasing member 93, i.e., the temperature to restore its original shape with the shape-memory effect, is set to the extremely-cold standard temperature (approximately 20 degrees centigrade in the present embodiment). Thus, when the cooling-water temperature in the delayed-temperature changing chamber 91f increases to the extremely-cold standard temperature or higher, the first temperature-responsive biasing member 93 generates the biasing force to bias the valve main body 91a in the opening direction. This biasing force of the first temperature-responsive biasing member 93 is set to be greater than a biasing force generated by the biasing member 92. Accordingly, the first temperature-responsive biasing member 93 can change the valve body 91 from its closed position in FIG. 3 to its opened position in FIG. 4 against the biasing force of the basing member 92 that biases the valve body 91 in its closing direction, which will be described below in detail.

The biasing member 92 is a compression coil spring that is made of steel iron or the like, and it functions as a bias spring to the first and second temperature-responsive biasing members 93, 94. The biasing member 92 is disposed outside the valve body 91 (specifically, the wide portion of the housing portion 91c), whose one end contacts the flange 91d of the housing portion 91c and whose the other end contacts a bottom face 71a of the thermostat housing 71, thereby biasing the valve body 91 to its closed position.

The second temperature-responsive biasing member 94 is disposed outside the basing member 92. The second temperature-responsive biasing member 94 is a compression coil spring made of a shape-memory alloy (e.g., Ni—Ti alloy, Cu—Zu—Al alloy), which extends with a shape restoring and thereby bias the valve main body 91a in the closing direction. One end of the second temperature-responsive biasing member 94 contacts the flange 91d of the housing portion 91c and the other end of that contacts the bottom face 71a of the thermostat housing 71, thereby biasing the valve body 91 to its closed position with its shape restoring.

The second temperature-responsive biasing member 94, which has the one-way shape-memory function that memorizes its shape to keep when the temperature increases, changes the valve main body 91a between its opened position and its closed position by the bias method with the bias member 92 and the first temperature-responsive biasing member 93 as the bias springs. The shape-restoring temperature of this second temperature-responsive biasing member 94 is set to the mild-cold standard temperature (approximately 70 degrees centigrade in the present embodiment) that is higher than the shape-restoring temperature of the first temperature-responsive biasing member 93. Thus, when the temperature of the cooling water that is located outside the housing portion 91c and flows inside the thermostat housing 71 increases to the mild-cold standard temperature or higher, the second temperature-responsive biasing member 94 generates the biasing force against the opening-direction biasing forces of the biasing member 92 and the first temperature-responsive biasing member 93 to bias the valve main body 91a to its closed position. Namely, the biasing force of the second temperature-responsive biasing member 94 is set to be greater than the total biasing forces that are generated by the biasing member 92 and the first temperature-responsive biasing member 93. Accordingly, the second temperature-responsive biasing member 94 can change the valve body 91 from its opened position in FIG. 4 to its closed position in FIG. 3 against the biasing forces of the basing member 92 and the first temperature-responsive biasing member 93.

Meanwhile, returning to FIGS. 1 and 2, there is provided the water pump 8 upstream the block-side water jacket 20a. Specifically, the water pump 8 is attached to one end portion at the front and upper portion of the cylinder block 21 (at the right upper portion of the front face in the figure). The water pump 8, the centrifugal water pump, is coupled to a crank pulley 55 that is provided at a lower end portion of a side face of the cylinder block 21 via a V belt (not illustrated). An impeller 82 disposed in a water pump housing 81 (see FIG. 3) is driven by rotation of the crank pulley 55. Thus, a rotational speed of the water pump 8 is set by an engine rotational speed. Accordingly, the flow amount of the cooling water that is fed into the block-side and head-side water jackets 20a, 20b by the water pump 8 in the normal condition, where the short-cut passage 232e is closed, is according to the engine rotational speed.

Upstream the water pump 8 is provided the thermostat 7 to maintain the cooling-water temperature at the proper temperature by opening and closing the radiator passage according to the cooling-water temperature. The thermostat 7 is disposed in the thermostat housing 71 attached to the front face of the cylinder block 21 near the water pump 8.

The thermostat 7, not illustrated, adjusts the cooling-water temperature within the proper range during the engine operation by opening and closing the radiator passage according to the cooling-water temperature. In the present embodiment, the thermostat 7 is a wax type of thermostat, in which a needle of the thermostat is pushed out by a wax that is melt and expanded by an increased wax's temperature and this pushing-out force functions to open a valve body that is biased in the closing direction. Herein, the thermostat 7 is configured such that its valve-body opening temperature (the passage-opening temperature) is set to approximately 76–82 degrees centigrade in the present embodiment. Namely, this thermostat 7 is operated mechanically, not electrically.

The thermostat housing 71 comprises, as shown in FIGS. 3 and 4, a block-side case 72 that is formed integrally with the cylinder block 21 and has a front-opening shape, and a lid-shaped case 73 that is provided to close this opening of the case 72. The valve opening mechanism 9 is disposed in the block-side case 72, and the thermostat 7 is disposed in the lid-shaped case 73. The block-side case 72 is connected to the block-side water jacket 20a via the short-cut passage 232e at its bottom face 71a, and connected to the water pump housing 81 at its peripheral side face.

The thermostat housing 7 has, as shown in FIGS. 1 and 2, the heater inlet port 7a formed at its top face, and a pressure-adjusting inlet port 7b and a radiator outlet port 7c that are formed at its front face. A common pipe 19 formed by the heater outlet pipe 16 and the bypass pipe 17 downstream is connected to the heater inlet port 7a. The pressure-adjusting inlet port 7b is connected to the pressure-adjusting pipe 18, while the radiator inlet port 7c is connected to the radiator outlet pipe 15 to return the cooling water that is heat-exchanged at the radiator 5 to the engine body 2.

The water outlet member 24 is provided at an upper portion on the side face of the engine body 2, which is opposite to the side where the water pump 8 is attached. One end of the water outlet member 24 is connected to the head-side water jacket 20b and the other end is divided into three ports of the radiator outlet port, heater outlet port and pressure-adjusting outlet port. To these ports are respectively connected the radiator inlet pipe 13 and the heater inlet pipe 14, which supply the cooling water heated at the engine body 2, and the bypass pipe 17 and the pressure-adjusting pipe 18.

Herein, the pressure relief valve 23 that is provided in the pressure-adjusting pipe 18 is a direct-operation type of pressure reducing valve, whose detailed description is omitted here, but it should not be limited to this type, but any other types can be adopted.

Figure 5:
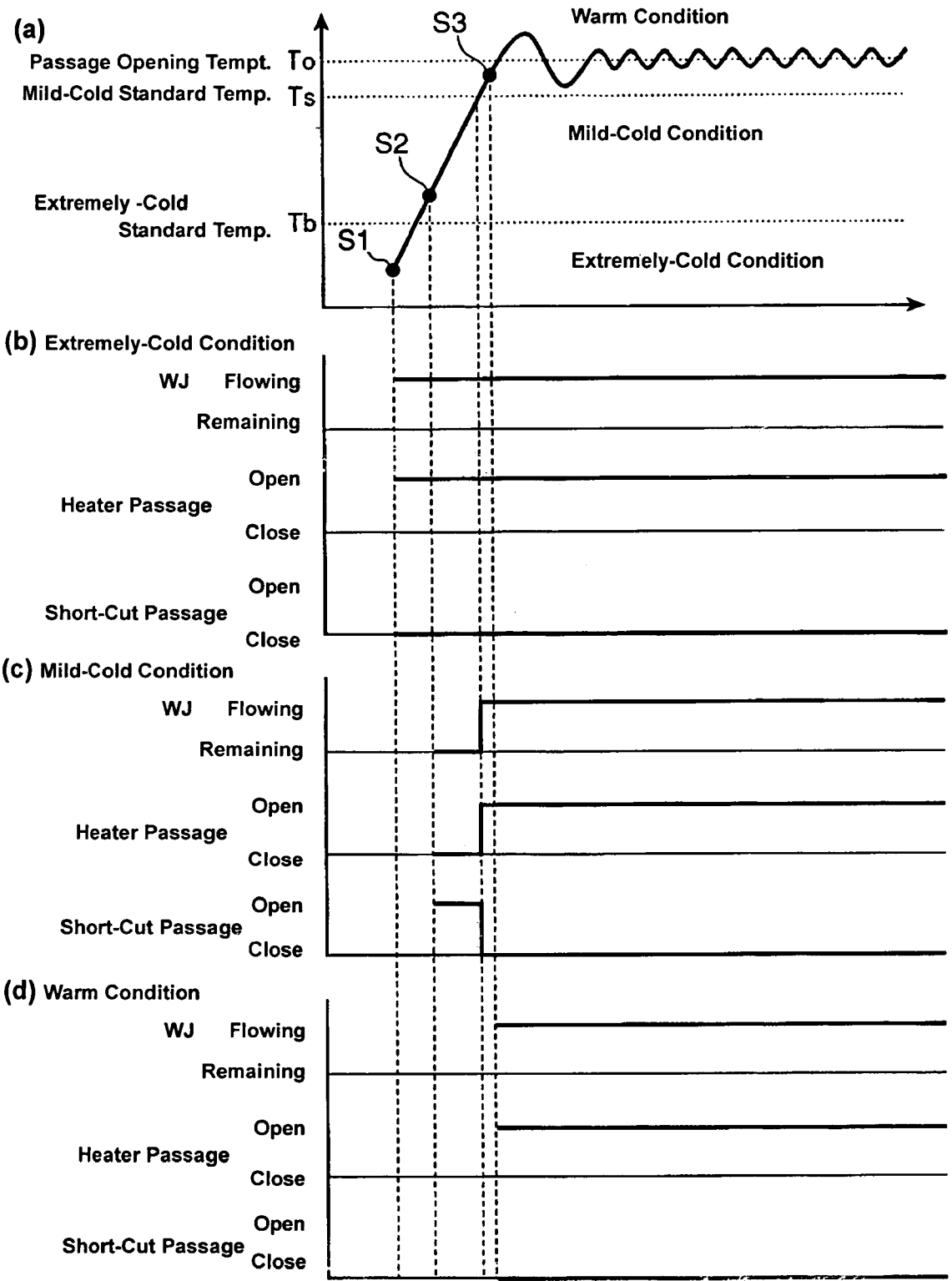

Next, the function of the cooling device of the engine 1 described above will be described. FIG. 5 is an explanatory diagram showing a time change of the cooling-water coolant temperature and the like, in which (a) shows the time change of the cooling-water coolant temperature according to the engine start and (b)–(d) show the time changes of the open/close state of respective passages according to the engine state.

In the device of the present embodiment, the engine temperature (cooling-water temperature) at the engine start is detected based on the shape-memory function of the first and second temperature-responsive biasing members 93, 94, and the circulation passage of the cooling water is switched according to this engine temperature.

First, the situation where the engine 1 is started from a point S1 of FIG. 5(a), i.e., from the engine's extremely-cold condition, will be described. When the engine 1 is in the extremely-cold condition, the cooling-water temperature is still lower than the shape-restoring temperature of the first and second temperature-responsive biasing members 93, 94. Accordingly, since only the biasing member 92 generates its biasing force, the short-cut passage 232e is kept closed with the valve body 91 of the valve opening mechanism 9 in this stage. And since the heater inlet port 7a is not closed by the housing portion 91c of the valve body 91 but still opened, the heater passage and the bypass passage are kept opened.

Also, since the cooling-water temperature does not reach the passage-opening temperature yet, the radiator passage is kept closed by the thermostat 7.

The crank pulley 55 rotates with the engine 1 starting, thereby the water pump 8 operates. All cooling water fed from the water pump 8 is introduced into the first cooling passage 232a of the water jacket 20. Then, part of the cooling water flows in the head-side water jacket 20b via the first through third connecting passages 201–203, and the rest of that flows through the block-side water jacket 20a and cools the cylinder block 21 from the exhaust side, and then flows in the head-side water jacket 20b via the forth connecting passage 204. In the head-side water jacket 20b, the cooling water from the second and third connecting passages 202, 203 flows down in the cylinder-line direction on the exhaust-side of the cylinder head 22, while the cooling water from the first and forth connecting passages 201, 204 flows down in the cylinder-line direction on the intake-side of the cylinder block 21. The cooling water flowing down in the head-side water jacket 20b gather and gets out of the outlet port 205 into the water outlet member 24.

The cooling water is divided in the water outlet member 24 and introduced into the heater inlet pipe 14 and the bypass pipe 17, which are opened in the engine's extremely-cold condition. Thus, when the engine is in the extremely-cold condition, the cooling water flows in the heater passage and the bypass passage with its normal flow amount, which is according to the engine speed. Accordingly, although the cooling-water temperature has not increased sufficiently yet, the cooling water is supplied to the heater unit 6 and thereby the heating of the vehicle cabin can be attained effectively. Namely, since the air temperature of the cabin is rather low in the engine's extremely-cold condition, the cooling-water introduced into the heater unit may conduct the heat exchange effectively with the air in the cabin. Thus, the passenger's heating requirement can be met to some extent, compared with a case where the heater unit 6 does not operate until the cooling-water temperature has increased to sufficiently high temperature.

As the engine rotational speed increases quickly, the amount of water fed by the water pump 8 also increases, so that the internal pressure of the bypass pipe 17 upstream the ATF warmer 52 and the heater inlet pipe 14 increase. Generally, there is a concern that the increase of the internal pressure of the pipes 17, 14 might cause a pipe's falling-off. According to the device of the present embodiment, however, the internal pressure of the pressure-adjusting pipe 18 also increases and thereby the pressure relief valve 23 is opened, so that the pipes 14, 17 can be prevented from falling off properly.

The cooling water from the heater unit 6, oil cooler 50 and ATF warmer 52 is introduced into the thermostat housing 71 via the heater inlet port 7a. Then, it is again fed to the water pump 8 via the thermostat housing 71.

As the cooling water circulates in the heater passage and the bypass passage, the temperature of the cooling water increases efficiently and exceeds the extremely-cold standard temperature Tb. At this point when the temperature of the cooling water flowing in the thermostat housing 71 exceeds the extremely-cold standard temperature Tb, the first temperature-responsive basing member 93 dose not generate the biasing force yet. Because the first temperature-responsive basing member 93 is located in the delayed-temperature changing chamber 91f and the temperature of the cooling water in the chamber has the time lag in changing (increasing), so the generation of the biasing force has the time lag accordingly. Herein, in the present embodiment this time lag is set to be longer than a period of time it takes that the cooling-water temperature in the passages in the normal condition of the engine 1 changes from the extremely-cold standard temperature Tb to the mild-cold standard temperature Ts. Thus, the bias force is not generated yet by the first temperature-responsive basing member 93 in the mild condition of the engine 1, so the valve opening mechanism 9 still closes the short-cut passage 232e.

Then, when the temperature of the cooling water flowing in the thermostat housing 71 exceeds the mild-cold standard temperature Tb, the second temperature-responsive basing member 94 generates its biasing force. The second temperature-responsive basing member 94 biases the valve body 91 of the valve opening mechanism 9 in the closing direction, so the valve body 91 is kept to close the short-cut passage 232e. Herein, since the biasing force of the first temperature-responsive basing member 93 is smaller than the total biasing forces of the biasing member 92 and the second temperature-responsive basing member 94, the valve body 91 is kept to close the short-cut passage 232e even if the temperature of the cooling water flowing in the delayed-temperature changing chamber 91f exceeds the extremely-cold standard temperature Tb and the first temperature-responsive basing member 93 generates the biasing force.

Subsequently, when the cooling-water temperature further increases and exceeds the passage-opening temperature To, the thermostat 7 opens the radiator passage and the cooling water is cooled efficiently by the radiator 5. As a consequence, as the cooling-water temperature decreases below the passage-opening temperature To, the thermostat 7 closes and the cooling-temperature starts increasing again. This operation repeats and thereby the cooling-water temperature is controlled within the proper range.

As described above, when the engine 1 is in the extremely-cold condition at the engine start, as shown in FIG. 5(a) the normal amount of cooling water flows in the water jacket 20 with the closed short-cut passage 232e. And the heater passage is in the opened state and ready to operate the heater unit 6 just after the engine start, so the relatively warm air can be supplied to the cabin with the very cold temperature. Thus, the heating can be met to the passenger's requirement from the engine start. Also, the cooling water flows in the heater passage and the bypass passage, not in the radiator 5, in the extremely-cold engine condition of the present device, so relatively quick engine warming-up can be attained.

Next, the case where the engine 1 is started from the mild-cold condition of the engine, i.e., from a S2 point in FIG. 5(a) will be described. In this condition, although it does not reach the shape-restoring temperature of the second temperature-responsive basing member 94, the cooling-water temperature has reached that of the first temperature-responsive basing member 93. Namely, the engine 1 in the mild-cold condition at its start means that it has not taken so long after the engine has stopped and therefore the temperature of the cooling water in the delayed-temperature changing chamber 91f is at least higher than extremely-cold standard temperature Tb. Accordingly, not only the biasing member 92 but the first temperature-responsive biasing member 93 generate the biasing forces. Thus, the valve body 91 of the valve opening mechanism 9 opens and the short-cut 232e is in the opened state because the first temperature-responsive biasing member 93 biases the valve body 91 in the opening direction with the biasing force that is larger than that of the biasing member 92. Herein, the heater inlet port 7a is closed by the housing portion 91c of the valve body 91, and the heater passage and the bypass passage are closed. Meanwhile, since the cooling-water temperature does not reach the passage-opening temperature, the thermostat 7 closes the radiator passage.

When the crank pulley 55 rotates with the engine 1 starting, the water pump 8 operates, and all cooling water fed from the water pump 8 is introduced into the first cooling passage 232a of the water jacket 20. Herein, since the short-cut passage 232e is opened, the internal pressure of the short-cut passage 232e is reduced by the water pump 8 nearby. Also the respective passages of the heater, bypass and radiator passages are closed. Accordingly, all amount of the cooling water is introduced into the thermostat housing 71 via the short-cut passage 232e, and then suck into the water pump 8 again. Namely, the cooling water is circulated in the short-cut passage 232e and thus the cooling water remains in the water jacket 20. Thereby, the cooling water in the water jacket 20 is heated promptly, so the quick warming-up of the engine can be attained and thus CO, HC, incomplete-combustion gas can be reduced, thereby improving the proper emission function of the engine.

When the cooling water circulates in the short-cut passage and its temperature increases the mild-cold standard temperature Ts, the second temperature-responsive biasing member 94 generates the biasing force. Since the total biasing forces of the second temperature-responsive biasing member 94 and the biasing member 92 is grater than the biasing force of the first temperature-responsive biasing member 93, the valve body 91 changes from its opened position to its closed position, so the short-cut passage 232e is closed. Thereby, the heater inlet port 7a is opened by the valve body 91 and the heater passage and the bypass passage are opened.

In this state, the heater unit 6 can be operated, and to the heater unit 6 is supplied the cooling water with the temperature higher than the mild-cold standard temperature Ts. Thus, the cooling water with a relatively high and stable temperature can be supplied to the cabin, so the passenger's heating requirement can be met properly.

As described above, when the engine 1 is in the mild-cold condition at the engine start, as shown in FIG. 5(c) the cooling water remains in the water jacket 20 with the opened short-cut passage 232e and the heater passage is closed. Thus, the cooling water is heated promptly, so the quick warming-up of the engine can be attained and the proper emission function of the engine can be provided. Then, after the engine 1 has changed to the warm condition, the short-cut passage is closed and thereby the normal flow amount of the cooling water flows in the water jacket 20 with the closed shot-cut passage. And the heater passage is opened and thereby the heater unit 6 is ready to operate. Thus, the cooling water with the relatively high and stable temperature can be supplied to the cabin, so the passenger's heating requirement can be met properly.

Next, the case where the engine 1 is started from the warm condition of the engine, i.e., from a S3 point in FIG. 5(a) will be described. In this condition, the cooling-water temperature has reached the shape-restoring temperature of the first and second temperature-responsive basing members 93, 94. Namely, the valve body 91 is in its closed position and closes the short-cut 232e because the biasing forces of the biasing member 92 and the second temperature-responsive biasing member 94 is larger than that of the first temperature-responsive biasing member 93. Herein, the heater inlet port 7a is opened by the housing portion 91c of the valve body 91, and the heater passage and the bypass passage are opened. Meanwhile, since the cooling-water temperature does not reach the passage-opening temperature, the thermostat 7 is still kept closing the radiator passage.

In this sate, the engine 1 has been warmed up sufficiently. Also, the cooling water has the relatively high temperature and so the air supplied to the cabin has a relatively high temperature. Accordingly, the normal engine operation can be maintained and the passenger's heating requirement can be met.

Then, the cooling-water temperature increases further and reach the passing-opening temperature To, and the thermostat 7 changed to its opened position. Thus, the cooling water flows in the radiator passage and the cooling water is cooled by the radiator 5 efficiently. As a consequence, when the cooling-water temperature becomes below the passing-opening temperature To, the thermostat 7 is closed and the cooling-water temperature increases again. With this operation repeated, the cooling-water temperature is controlled to be within the proper temperature range.

As described above, when the engine 1 is in the mild-cold condition at the engine start, as shown in FIG. 5(d), the normal amount of cooling water, which is according to the engine rotational speed, flows in the water jacket 20 with the closed short-cut passage. This cooling water then flows down the heater passage and the bypass passage, so that the normal engine operation state of the engine 1 is maintained.

As described above, according to the cooling device of the engine 1 of the present embodiment, the temperature of the engine 1 is determined mechanically, not eclectically, and either one of requirements of the passenger's heating and the engine's quick warming-up is given priority to according to the temperature in the vehicle cabin based on this engine temperature, so that the both requirements can be met effectively.

Further, the cooling-water temperature can be determined by utilizing the biasing forces of the first and second temperature-responsive biasing members 93, 94 with different shape-restoring temperatures, and the amount of the cooling water in the water jacket 20 can be adjusted surely and at low costs with the mechanical structure. Also, by using the thermostat with the mechanical structure, the flow adjustment can be attained further surely and lower costs.

The present invention should not limited to the above-described embodiment, and any other modifications can be adopted within a scope of the present invention.

The following are some examples of such modifications.

(1) Although in the above-described embodiment the cooling water flows in the cylinder block 21 on the exhaust side first and then on the intake side, the structure of the block-side water jacket 20a of the cylinder block 21 should not to be limited to a particular one.

Figure 6:
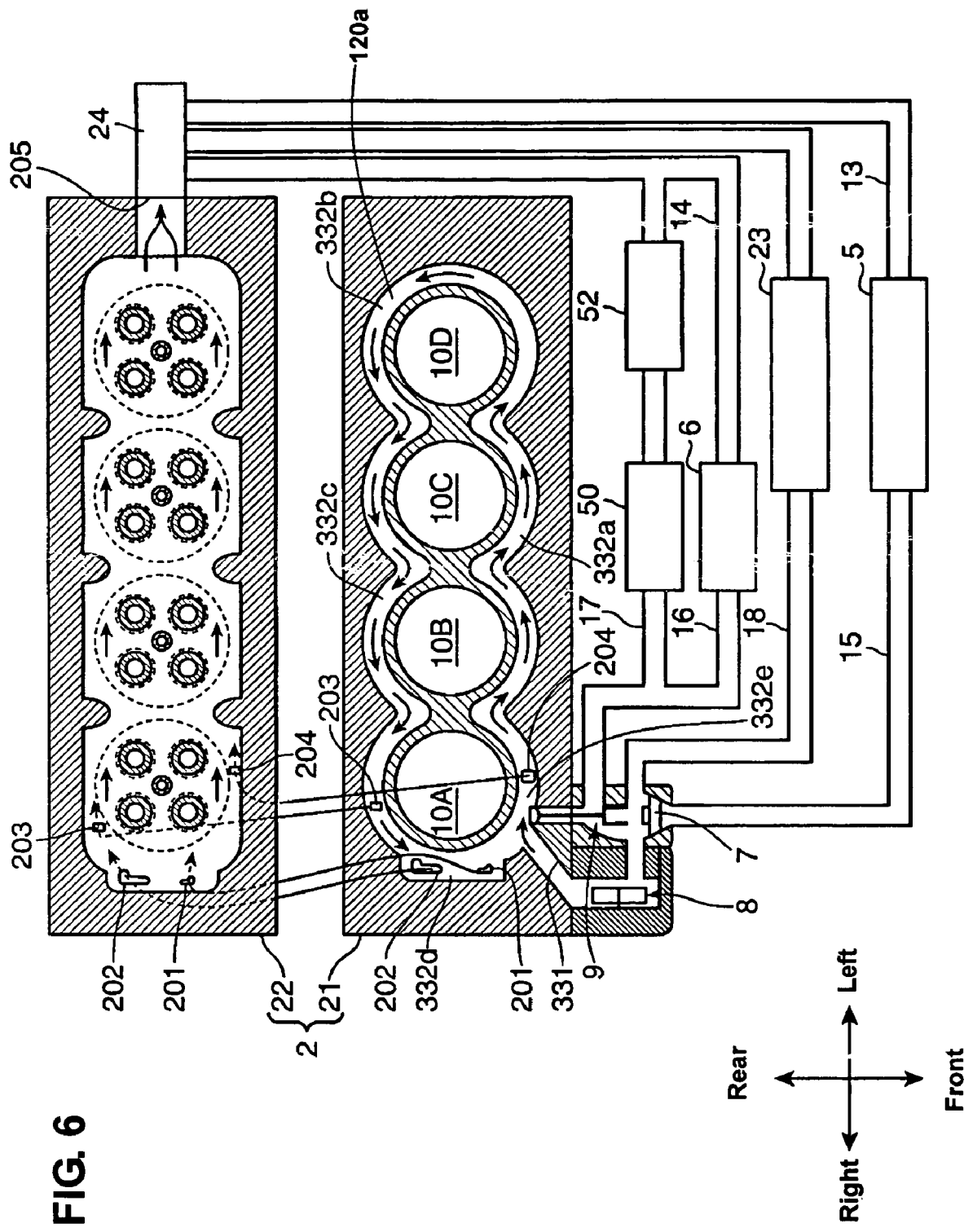
FIG. 6 is an explanatory diagram showing schematically a modified embodiment of the cooling device of an en engine according to the present invention.
Figure 7:
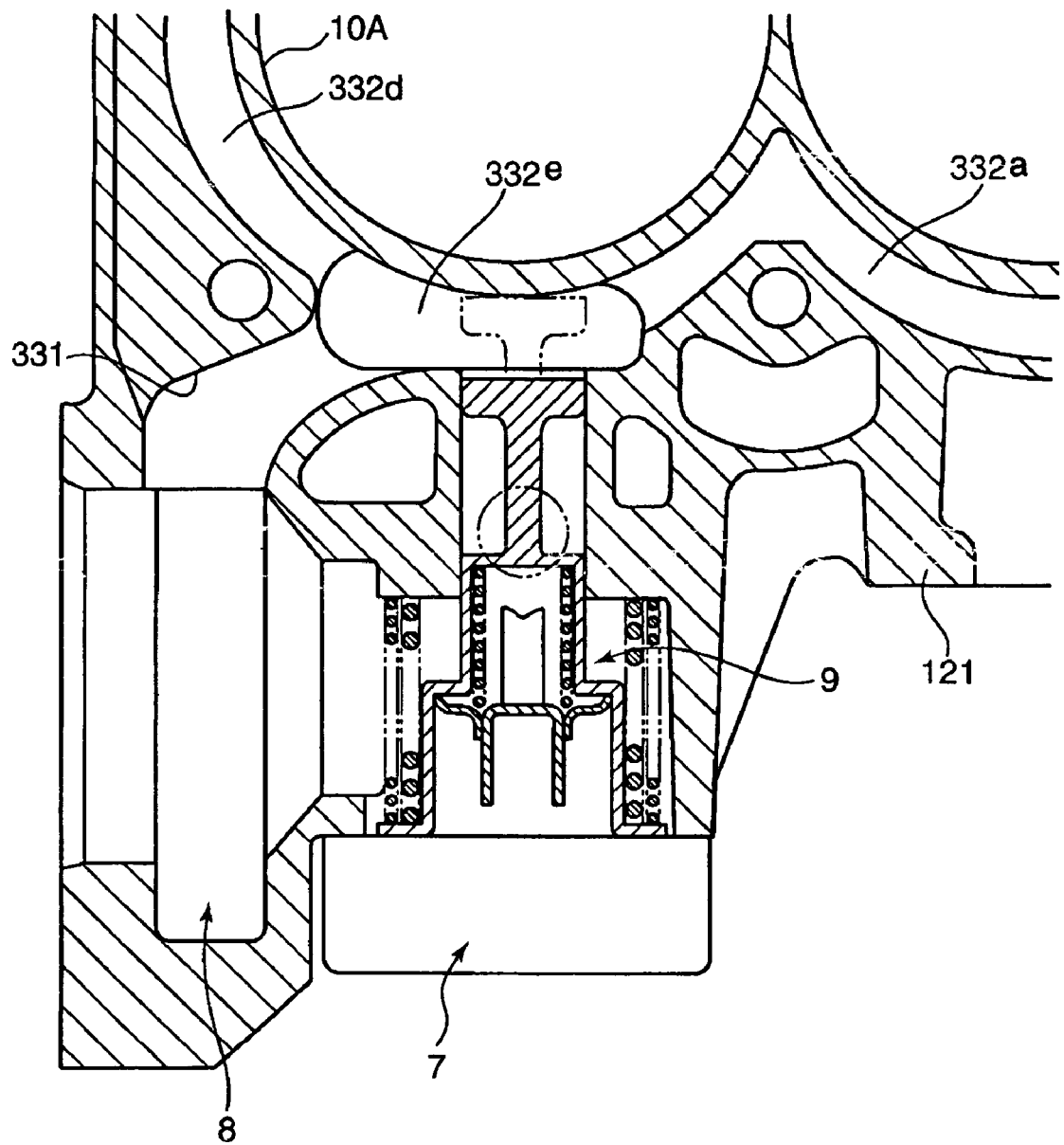
FIG. 7 is a sectional view of a major part of a flow adjusting device of the modified embodiment.

For example, as shown in FIGS. 6 and 7, the cooling water may be configured so as to flow in the cylinder block 21 on the intake side first and then on the exhaust side. In this modification the cylinder block structure differs from the above-described embodiment. A different point will be described.

A cylinder block 121 of this modification adopts the U-turn type likewise, but a water jacket 120a surrounds the cylinders 10A–10D and has no the partition wall 233 of the above-described embodiment.

Specifically, the block-side water jacket 120a, as shown in FIG. 6, includes a intake-side cooling passage 332a that extends, along the cylinder line, from a cooling-water inlet port 331 to the other longitudinal-side (left side in the figure) of the cylinder block 121 on the front side of the cylinder block 121, i.e., on the intake side of the cylinder block 121, a turn cooling passage 332b that is connected to the intake-side cooling-water passage 332a and extends rearward on the other longitudinal-side (left side in the figure) of the cylinder block 121, an exhaust-side cooling passage 332c that is connected to the turn cooling passage 232b and extends along the cylinder line on the rear side, i.e., on the intake side of the cylinder block 121, to the one longitudinal-side (right side in the figure) of the cylinder block 121, and a connecting cooling passage 332d that is connected to the exhaust-side cooling-water passage 332c and extends forward on the one longitudinal-side (right side in the figure) of the cylinder block 121. The cooling water flows in order of the first through forth cooling passages 332a–332d. A short-cut passage 332e opens at a base end portion of the intake-side cooling passage 332a like the above-described embodiment, which constitutes the short-cut passage.

Herein, the cooling-water inlet port 331 is configured as shown in FIG. 7 such that its downstream end is inclined toward the inside of the cylinder block 121, so the cooling water can be easily introduced into the intake-side cooling passage 332a.

Accordingly, with either one of requirements of the passenger's heating and the engine's quick warming-up being given priority to properly, the both requirements can be effectively met. Also, since the block-side water jacket 120a surrounds the cylinders 10A–10D, part of the cooling water can be circulated in the block-side water jacket 120a in the engine mild-cold condition, the quick warming-up of engine can be attained efficiently with the proper heat exchanging.

(2) Although the cooling water remains in the water jacket 20 in the engine mild-cold condition in the above-described embodiment, part of the cooling water may be circulated, for example, in the bypass passage. In this case the same effect as the above-described embodiment can be obtained.

(3) Although in the above-described embodiment the biasing member 92 biases the valve body 91 in its closing direction, the first temperature-responsive biasing member 93 biases the valve body 91 in its opening direction and the second temperature-responsive biasing member 94 biases the valve body 91 in its closing direction, the same operation of the valve body 91 can be provided by properly setting the shape-restoring temperature and the biasing forces other than these.

(4) The oil cooler 50 and others, which are adopted at the bypass pipe 17 in the above-described embodiment, may be omitted. In this case, the cooling water is circulated in the water jacket 20 without substantial heat exchanging at the bypass pipe 17, so the cooling-water temperature can be increased efficiently.

(5) In the above-described embodiment when the engine is started from the extremely-cold condition, the valve body 91 remains in its closed position even if the cooling-water temperature exceeds the extremely-cold standard temperature Tb and thus the opening control of the valve body 91 in the warm condition is conducted. However, the time lag of the delayed-temperature changing chamber 91f may be shorter, for example, by narrowing the volume of this chamber 91f or forming a through hole to connect the outside at this chamber 91f, so the valve body 91 may be changed to its opened position when the cooling-water temperature has increased and is in the engine mild-cold condition.

What is claimed is:
1. A cooling device of an engine, comprising:
a radiator passage in which coolant is circulated by a water pump between a water jacket of the engine and a radiator;
a thermostat provided in the radiator passage and operative to open the radiator passage when an engine temperature is a specified passage-opening temperature or higher, and to close the radiator passage when the engine temperature is lower than the specified passage-opening temperature;
a heater passage in which the coolant is circulated between the water jacket and a heater unit for heating of a vehicle cabin; and
a flow adjusting device operative to adjust a flow amount of the coolant that flows in the water jacket according to the engine temperature at an engine start,
wherein said flow adjusting device is configured so as to adjust the flow amount of the coolant flowing in the water jacket to be a normal amount when the engine temperature is in an extremely-cold condition where the engine temperature is lower than the specified passage-opening temperature and lower than an extremely-cold standard temperature, to be zero or smaller than the normal amount when the engine is in a mild-cold condition where the engine temperature is or higher than the extremely-cold standard temperature and lower than a mild-cold standard temperature that is lower than the specified passage-opening temperature, and to be the normal amount when the engine is in a warm condition where the engine temperature is or higher than the mild-cold standard temperature,
and said heater passage is configured so as to be opened at least when the engine is in the extremely-cold condition.

2. The cooling device of an engine of claim 1, wherein said flow adjusting device is configured so as to detect the engine temperature based on the temperature of the coolant and to comprise a delayed-temperature changing chamber where the coolant temperature changes with a time lag relative to the temperature of the coolant outside thereof, and the extremely-cold condition of the engine is determined based on the temperature of the coolant that is in the delayed-temperature changing chamber.

3. The cooling device of an engine of claim 1, wherein said flow adjusting device comprises a short-cut passage to interconnect an inlet port and an outlet port of the water pump and a valve-opening mechanism operative to open and close the short-cut passage, and said flow adjusting device is configured so as to reduce the flow amount of the coolant flowing in the water jacket by opening the short-cut passage to introduce at least part of the coolant fed from the water pump into the short-cut passage.

4. The cooling device of an engine of claim 3, wherein said valve-opening mechanism of the flow adjusting device comprises a valve body operative to open and close said short-cut passage, a biasing member operative to bias the valve body in its opening direction or in its closing direction, a first temperature-responsive biasing member operative to generate a biasing force according to changing of the coolant temperature so as to bias the valve body in an opposite direction to said biasing direction of the biasing member, and a second temperature-responsive biasing member operative to generate a biasing force according to changing of the coolant temperature so as to bias the valve body in the same direction as said biasing direction of the biasing member, said first and second temperature-responsive biasing member are configured such that a specified temperature thereof at which said biasing force is generated is set to either said extremely-cold standard temperature or said mild-cold standard temperature, and said valve opening mechanism is configured to so as to bias said valve body to its closed position when the engine at starting is in said extremely-clod condition, to bias said valve body to its opened position when the engine at starting is in said mild-clod condition, and to bias said valve body to its closed position when the engine at starting is in said warm condition.

5. The cooling device of an engine of claim 4, wherein said thermostat is a mechanical thermostat that is operated mechanically.

6. A cooling device of an engine, comprising:
a radiator passage in which coolant is circulated between a water jacket of the engine and a radiator when an engine temperature is a specified passage-opening temperature or higher;
a heater passage in which the coolant is circulated between the water jacket and a heater unit for heating of a vehicle cabin, part of the heater passage overlapping with said radiator passage;
a water pump operative to circulate the coolant, the water pump being disposed at an overlapping portion of said passages;
a short-cut passage to interconnect an upstream passage and a downstream passage of said water pump; and
a valve-opening mechanism operative to adjust a flow amount of the coolant that flows in the water jacket by opening and closing said short-cut passage,
wherein said valve-opening mechanism comprises a valve body operative to open and close said short-cut passage, an elastic member operative to bias the valve body in its closing direction, a first shape-memory-alloy spring operative to bias the valve body in its opening direction by responding to a specified temperature that is a shape-restoring temperature thereof or higher, and a second shape-memory-alloy spring operative to bias the valve body in its closing direction by responding to a specified temperature that is a shape-restoring temperature thereof or higher, said shape-restoring temperature of the first shape-memory-alloy spring being set to a first switching temperature that is lower than said specified passage-opening temperature, said shape-restoring temperature of the second shape-memory-alloy spring being set to a second switching temperature that is lower than said specified passage-opening temperature and higher than the first switching temperature,
and said valve opening mechanism is configured to so as to bias said valve body to its closed position when the coolant temperature is lower than said first switching temperature, to bias said valve body to its opened position when the coolant temperature is or higher than said first switching temperature and lower than said second switching temperature, and to bias said valve body to its closed position when the coolant temperature is or higher than said second switching temperature.

7. The cooling device of an engine of claim 6, wherein said valve body comprises a delayed-temperature changing chamber where the coolant temperature changes with a time lag relative to the temperature of the coolant outside thereof, and said first shape-memory-alloy spring is disposed in said delayed-temperature changing chamber.

8. The cooling device of an engine of claim 6, wherein said opening valve mechanism is disposed in a housing that is located near said water pump, there is provided a heater-inlet port to introduce the coolant fed from said heater unit into said housing, and said valve body is disposed in said housing in such a manner that said heater-inlet port is closed by the valve body that is in its opened position, while said heater-inlet port is opened by the valve body that is in its closed position.

9. The cooling device of an engine of claim 8, wherein said water pump is a centrifugal water pump that is provided upstream said water jacket and downstream of said housing, an inside of said housing is connected to an upstream-end portion of said water jacket via said short-cut passage, and there are provided in the hosing a radiator-inlet port to introduce the coolant fed from said radiator into said housing and a thermostat operative to open and close said radiator passage according to the temperature of the coolant.

* * * * *